April 22, 1958 R. A. TRACY 2,832,062

MAGNETIC DEVICE

Filed Nov. 13, 1952 2 Sheets-Sheet 1

INVENTOR
ROBERT A. TRACY
BY
Donald W. Phillion
ATTORNEY

April 22, 1958 R. A. TRACY 2,832,062

MAGNETIC DEVICE

Filed Nov. 13, 1952 2 Sheets-Sheet 2

INVENTOR
ROBERT A. TRACY
BY
Donald W. Phillion
ATTORNEY

United States Patent Office 2,832,062

Patented Apr. 22, 1958

2,832,062

MAGNETIC DEVICE

Robert A. Tracy, Drexel Hill, Pa., assignor to Burroughs Corporation, Detroit, Mich., a corporation of Michigan Application November 13, 1952, Serial No. 320,260

7 Claims. (Cl. 340—174)

This relates generally to magnetic devices and more particularly to information bearing magnetic elements and means for reading said information therefrom without removing said information from said magnetic elements.

The use of magnetic elements to store and utilize information is well known in the art. Magnetic cores have the characteristics of permanency of magnetic flux condition without a constant or repetitive power source, relatively unchanging properties with age and use, and low maintenance costs. One difficulty encountered in the use of magnetic cores or elements occurs when reading stored information from said magnetic core. Under known means of reading information from a magnetic element, the information is removed during the process.

Transient oscillations have often been observed when using current pulses to switch the flux in magnetic cores. Ordinarily, they constitute a problem in that they make measurements of magnetic properties difficult, and, often in the application of the magnetic cores, restrictions are imposed due to the presence of the oscillations.

Transient oscillations, or as it is sometimes referred to, ringing, is a phenomenon often seen when a toroid of this magnetic material is subjected to a current pulse through a winding enclosing a portion of the material. Ringing occurs most often when using fast switching cores that have a large number of turns on a winding to which current pulses are applied. The ringing occurs at the beginning and at the end of the pulse. Under the proper conditions the ringing may cause the core to traverse the hysteresis loop several times at the end of a pulse. Proper utilization and control of these transient oscillations with appropriate structure to permit nondestructive readout of information stored in a magnetic element comprise the present invention.

It is an object of this invention to provide a non-destructive readout system to obtain information stored in a magnetic element.

It is a further object of this invention to utilize transient oscillations to obtain non-destructive readout of a magnetic core.

In accordance with one embodiment, the invention comprises a magnetic core having a first means associated therewith adapted to cause said magnetic core to selectively assume a condition of a first or a second polarity, a second winding means associated with said magnetic core, an energizing source adapted to energize said second winding means with a constant current pulse which will, acting in conjunction with the stored energy of said magnetic core when said magnetic core has a magnetic flux condition of said first polarity, cause one oscillation of the mgnetic flux of the said magnetic core such that the magnetic core will switch to the second polarity and return to a condition of remanence of said first polarity upon termination of said energization of said second winding means, and when said magnetic core has a remanence of said second polarity, cause said magnetic core to go to a state of negative saturation and return to a condition of said second polarity upon termination of said energization of said second winding.

In accordance with one feature of the invention the amount of energy put into a circuit containing a magnetic core can be predetermined by the state of the core and the amplitude and duration of the current pulse so that the magnetic flux condition of said magnetic core will traverse the hysteresis loop in such a manner as to result in the said magnetic core selectively assuming a condition of either positive or negative remanence or any magnetic flux condition therebetween.

These and other objects and features of the invention will be more readily understood from the following detailed description thereof when read in conjunction with the drawings in which.

Figure 2:
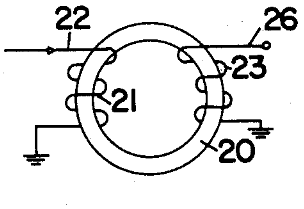
Fig. 2 is a schematic drawing of a magnetic core having an input winding and an output winding.
Figure 11:
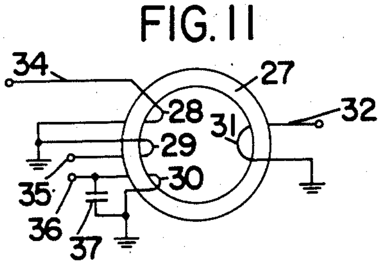
Figure 17:
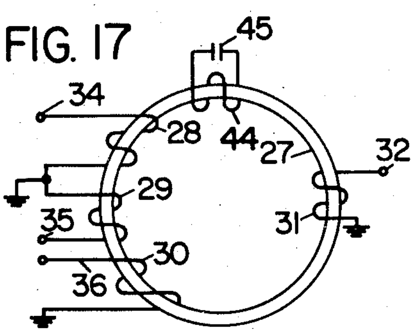

Figs. 3, 4, 5, 6, 7, 8, 9, and 10 are charts of input current to the input winding of Fig. 2 and resultant magnetic flux conditions;

Fig. 11 is a schematic sketch of the invention;

Figs. 12, 13, 14, 15, and 16 represent current inputs into the magnetic core of Fig. 11 and magnetic flux conditions resulting therefrom;

Fig. 17 is a modification of the structure shown in Fig. 11; and

Figure 18:
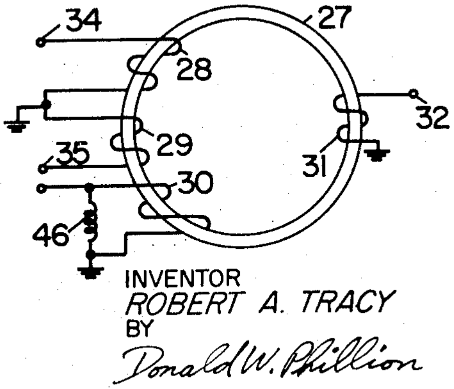

Fig. 18 is another modification of the structure shown in Fig. 11.

Figure 1:
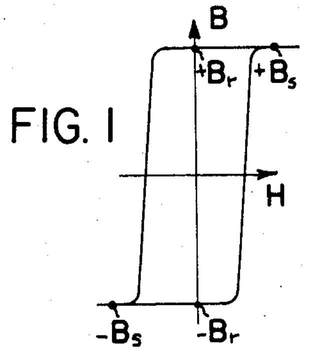
Fig. 1 is a typical hysteresis loop of the type magnetic material suitable for use in this invention.

Referring now to Fig. 2 magnetic core 20 can be composed of materials such as deltamax, orthonik, molypermalloy, or ferramic which have hysteresis loops similar to that shown in Fig. 1. Magnetic core 20, in this embodiment, has a cross sectional area of $2.5 \times 10^{-4}$ square inches and a mean circumference of about one inch. Winding 21 is composed of 100 turns and has an input terminal 22. Winding 23 is composed of 100 turns and has a distributed capacitance of about 50 micromicrofarads. The output signal can be taken from terminal 26.

In Fig. 1, positive magnetic flux saturation of a magnetic core such as core 20 of Fig. 2 is indicated as point $+Bs$ on the curve. Positive remanence is indicated as point $+Br$. Negative magnetic flux saturation is denoted by reference character $-Bs$ and negative remanence is denoted by reference character $-Br$.

Referring to Fig. 11, magnetic core 27 is of deltamax material having a hysteresis loop characteristic similar to that of Fig. 1. It is to be noted that other magnetic materials having suitable hysteresis loop characteristics can be utilized in the structure of Fig. 11 and also in the structure of Fig. 2. Input windings 28 and 29 each are composed of 100 turns. Winding 30 is composed of about 200 turns and has connected in parallel therewith a capacitance 37 of about 100 micromicrofarads. Output winding 31 has 100 turns. The output signal can be detected at terminal 32.

In Fig. 17, that part of the structure which is similar to the structure of Fig. 11 is denoted by the same reference characters. Capacitor 37 of Fig. 11 is not a part of the structure of Fig. 17. A further change is the addition of oscillatory circuitry comprising inductive winding 44 and capacitor 45.

In Fig. 18, that part of the structure which is similar to the structure of Fig. 11 is denoted by the same reference characters.

As stated hereinbefore, transient oscillations, or ringing, is a phenomenon occurring when a thin toroid of magnetic material is subjected to a current pulse through a winding enclosing a portion of the material.

The winding contains distributed capacitance and is itself an inductance, thus forming a parallel LC circuit.

When the magnetic core switches magnetic flux state from one polarity to the other polarity a large voltage is developed across the winding charging the distributed capacitance and thus putting energy into this oscillatory system. In order to dissipate this energy, current must flow through the winding on the core, and when this occurs in the proper direction a magnetic flux change is caused in the magnetic core. The remanent magnetic state of the magnetic core after the oscillations die out depends on the number of oscillations which is, in turn, dependent on the energy of the system at the end of the applied current pulse.

Where the inductance L in the parallel LC circuit referred to in the preceding paragraph involves a square loop core material, two values of L can be obtained depending whether or not the core switches. More specifically, the core winding represents a low inductance when, in response to the applied pulse, the core flux changes, in Fig. 1, from +B*r* to +B*s*, or from —B*r* to —B*s*, but represents a high inductance when the flux changes from —B*r* to +B*s*, or from +B*r* to —B*s*.

Consider now the charge on the capacitance C at the end of the applied pulse, where C is the capacitance across the coil. This capacitance may be either the distributed capacitance alone or the distributed capacitance in combination with a shunt physical capacitor. At the termination of the applied pulse, the core is always in a saturated state, being either at +B*s* or —B*s*. Thereafter, if no further magnetizing force be applied, the core flux would, due to the square loop characteristic of the core material, merely change from +B*s* to +B*r*, or from —B*s* to —B*r*. This flux change is relatively small and it follows therefore that the energy stored in the inductance at the end of the pulse is small. The only other energy that we need consider, then, is the energy stored in the capacitance at the end of the applied pulse.

With respect now to the factors which control the charge on the capacitor at the end of the applied pulse, as indicated previously, the LC circuit rings in response to the leading as well as the trailing edge of the applied pulse. Accordingly, the charge on the capacitor C at the instant of termination of the applied pulse is a function of the ringing frequency set up by the leading edge of the pulse. Moreover, since the inductance L has a different value in the case where the core switches than in the case where the core does not switch, and since the ringing frequency is a function of the product LC, it is seen that the ringing frequency for the two cases is different and depends upon whether the core switches or not. By proper choice of circuit parameters, the frequency of the ringing initiated by the leading edge of the pulse may, for example, be made such that, at the instant of termination of the applied pulse, the capacitance C, in the case where the core switches, is charged to a peak value but has a substantially zero charge where the core does not switch. It will be understood that during the period of application of the pulse, capacitor current flows into and out of the coil winding, aiding or opposing the coil current due to the applied pulse, but that when the applied pulse is removed, the flow of current thereafter through the coil winding is dependent upon the charge on the capacitor at the instant of pulse termination, which, in turn, is a function of the frequency of the ringing which was initiated by the leading edge of the applied pulse (as determined by the values of L and C) and the duration of the applied pulse.

Consider now the switching effect of the capacitor charge. If, at the end of the applied pulse, the capacitor has a negative charge and the charge is adequate, the initial discharge of the capacitor will drive sufficient current through the coil winding to switch the core from +B*s* to —B*s*. If, on the other hand, at the end of the applied pulse the capacitor has a positive charge and the charge is adequate and the core flux level is +B*s*, the capacitor will discharge through the low inductance core winding with very little loss and current will flow into the other plate of the capacitor charging it negatively. The negatively charged capacitor will then discharge through the core winding and in so doing will switch the core. If, in a third case, at the end of the applied pulse, the capacitor charge be at the zero point in the oscillation cycle, no switching of the core due to discharge of the capacitor will occur.

Figures 3, 4, 5, 6, 7, 8, 9, 10:
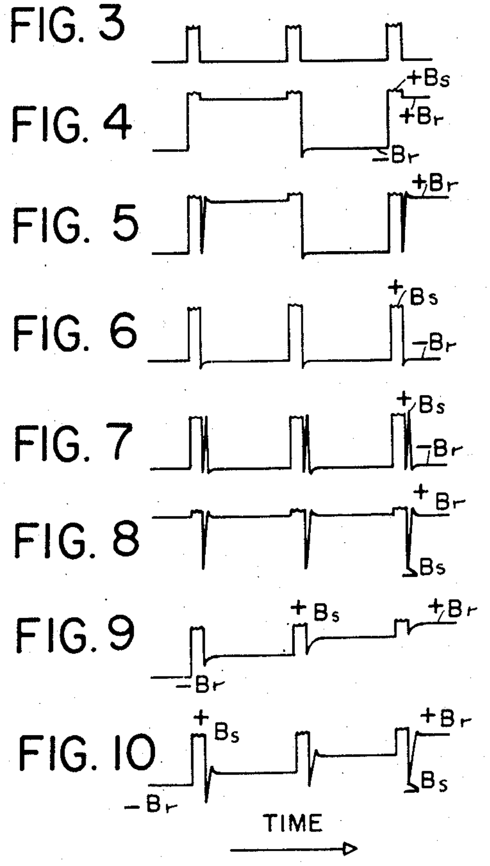

Consider now Figures 3 through 10 of the drawing. Fig. 3 shows three applied current pulses each of positive polarity applied to terminal 36 of Fig. 11. Fig. 4 shows the flux waveforms for the core 27 of Fig. 11 where the core remanence and circuit parameters are such that the first pulse of Fig. 3 switches the core 27 from —B*r* to +B*s*, the termination of the first pulse finds the charge on the capacitor 37 at substantially zero, the core flux level merely sliding back from +B*s* to +B*r*, the second pulse merely drives the core from +B*r* to +B*s* but the termination of the second pulse finds sufficient energy in the capacitor 37 to switch the core from +B*s* to —B*s*, the core flux level then sliding back to —B*r*. The cycle then repeats, the action due to the third pulse being the same as that due to the first. It will be understood from what has been said previously, that the reason why the capacitor 37 can have substantially zero energy stored therein when the core switches and appreciable energy therein when the core does not switch is that the ringing frequencies for the two situations are different, since L is different. Fig. 4 illustrates a case where the circuit parameters are such that at the instant the applied pulse ends the oscillation cycle of the capacitor energy is at substantially zero value for the ringing frequency which attends core switching but is at a substantial negative value for the ringing frequency which attends non-switching.

Figure 5 shows the flux waveforms of core 27 of Fig. 11 for the situation where the circuit parameters are such that at the end of the first pulse of Fig. 3 (which effects switching of the core) a peak amount of energy is in the capacitor sufficient on discharge not only to drive the core from +B*s* to —B*s* but to recharge the capacitor in the opposite polarity, so that discharge of the recharged capacitor switches the core from —B*s* back to +B*s*. At the termination of the second pulse (which does not switch the core), the oscillation cycle is at a point substantially less than peak with sufficient energy in the capacitor to switch the core only from +B*s* to —B*s*. Thus, Fig. 5 illustrates the situation where the two ringing frequencies are such that at the termination of a pulse which switches the core there is a substantially larger amount of energy stored in the capacitor than is the case at the termination of a pulse which does not switch the core.

Figure 6 illustrates the situation where each of the applied pulses switches the core from —B*s* to +B*s* leaving, at the termination of the pulse, sufficient energy in the capacitor to switch the core back from +B*s* to —B*s*.

Figure 7 illustrates a situation where each of the applied pulses switches the core from —B*s* to +B*s* leaving, at the termination of the pulse, a larger amount of energy in the capacitor than in the case of Fig. 6. This larger amount of energy is sufficent on discharge to switch the core from +B*s* to —B*s* and to recharge the capacitor, and then on discharge of recharge to switch the core back again to +B*s* and to again recharge the capacitor, which on its next discharge switches the core back again to —B*s*.

Figure 8 illustrates the case where the applied pulse does not switch the core but at the termination of the pulse there is sufficient energy in the capacitor to switch the core on initial discharge from +B*s* to —B*s*, and on discharge of recharge back from —B*s* to +B*s*.

It will be understood that in each of the cases illustrated in Figs. 4, 5, 6, 7 and 8, after the current passing through the coil ceases, such current being driven therethrough either by the external source or by the energy in the capacitor, the flux level in the core slides back from the saturation level to the remanence level.

Figures 9 and 10 illustrate that the circuit constants can be so chosen that the capacitor energy is finally dissipated when the core is but partially switched. For example, in Fig. 9 the first pulse switches the core from $-Br$ to $+Bs$ and at the termination of the pulse there is sufficient energy in the capacitor to return the core toward, but not all the way to, $-Bs$. The second pulse then switches the core back to $+Bs$ leaving, in the capacitor, somewhat less energy than in the case of the first pulse, so that the core is returned a lesser extent toward the other remanent state $-Bs$.

Figure 12:
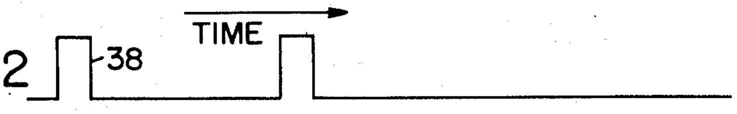
Figure 13:
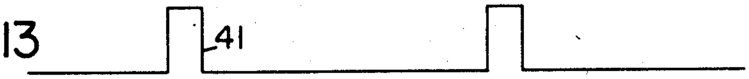
Figure 14:
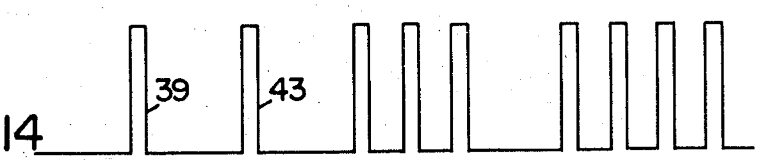
Figure 15:
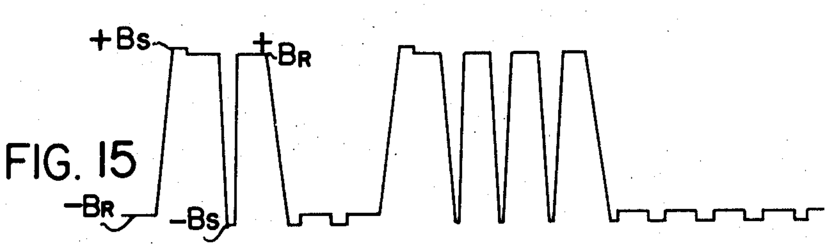
Figure 16:
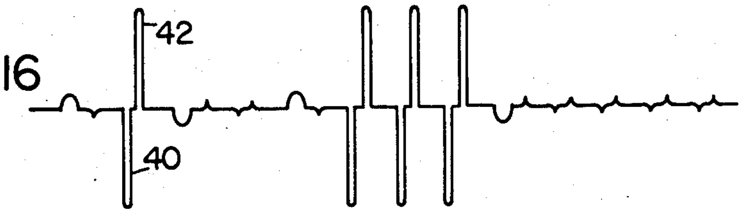

The operation of the complete circuit of Fig. 11 will now be described. Assume that with core 27 in a state of negative remanence the positive current pulse 38 of Fig. 12 is applied to input terminal 34 of winding 28. This current pulse is of relatively low amplitude but is of sufficient duration to slowly switch the core 27 from $-Br$ to $+Bs$, as shown in Fig. 15. The amplitude of the pulse 38 is sufficiently low to avoid shock exciting, and thereby to avoid ringing in, the LC circuit comprising interrogation winding 30 and capacitor 37, and the switching of core 27, in response to low amplitude pulse 38, is at a sufficiently slow rate to prevent the development of an appreciable output voltage in output winding 31. Upon termination of the current pulse 38, magnetic core 27 slides back from positive saturation $+Bs$ to positive remanence $+Br$, as shown in Fig. 15. Next, the high-amplitude interrogation current pulse 39 of Fig. 14 is impressed upon terminal 36 of interrogation winding 30. This interrogation current pulse 39 flows through the winding 30 in a direction and in an amount to rapidly switch the core 27 from its positive remanent state $+Br$ to negative saturation $-Bs$, as shown in Fig. 15. The switching of core 27 in response to the high-amplitude interrogation pulse 39 is sufficiently fast to cause an appreciable induced voltage to appear at the output terminal 32 of Fig. 11. This induced output voltage is shown in Fig. 16 as the voltage pulse 40. The high-amplitude interrogation pulse 39 shock excites and causes ringing in the LC circuit comprising the interrogation winding 30 and the capacitor 37. The circuit parameters are such that the frequency of the ringing initiated by the leading edge of the interrogation pulse 39 is so related to the duration of the interrogation pulse that at the instant of termination of pulse 39 the charge on the capacitor 37 is of substantial magnitude. This charge is discharged through the winding 30, the discharge current being sufficient to switch the core from $-Bs$ to $+Bs$, as shown in Fig. 15. The switching of the core 27 induces an output voltage in output winding 31 of Fig. 11 in the form of a positive voltage spike 42 shown in Fig. 16. Next, the low-amplitude positive current pulse 41 of Fig. 13 is impressed upon input terminal 35 of winding 29 of Fig. 11 and causes the core 27 to switch slowly from positive magnetic remanence to negative saturation, as shown in Fig. 15. As in the case of low-amplitude pulse 38, no ringing is induced by pulse 41 in the interrogation circuit 30, 37 and no output voltage is induced in output winding 31. Next, the high-amplitude interrogation pulse 43 is applied to terminal 36. This pulse shock excites and induces ringing in the LC circuit 30, 37. However, the frequency of the ringing initiated by the leading edge of interrogation pulse 43 is different than that initated by the leading edge of interrogation pulse 39, the reason being that at the time the pulse 43 was applied, the core 27 was already in the negative state of remanence to which pulse 43 tends to drive the core, whereas pulse 39 switched the core. In the case of pulse 43, the ringing frequency is such that at the instant of termination of pulse 43 the charge on capacitor 37 is low and insufficient to switch the core. Thus, following termination of interrogation pulse 43 the core 27 remains at negative remanence. This is shown in Fig. 15. It will be seen, in summary, that interrogation pulse 39, which found the core 27 at positive remanence and switched it to negative saturation is effective through the oscillatory action of the LC circuit 30, 37 to switch the core back from negative saturation to positive remanence, whereas interrogation pulse 43, which found the core at negative remanence, leaves the core at negative remanence. Thus, both the interrogating pulses 39 and 43 leave core 27 in the same state which the core was in at the time of application of the interrogating pulse.

Interrogation may be accomplished as many times in each state as desired as shown in Figs. 12, 13, 14, 15, and 16.

In Fig. 17, there is shown another embodiment wherein the oscillatory circuit is principally determined by inductive winding 44 having 200 turns and about 100 micromicrofarad capacitance 45. This circuit operates essentially the same as the circuit of Fig. 11 except that the energy utilized for transient oscillations is stored in the oscillatory circuit composed of winding 44 and capacitor 45.

Referring now to Fig. 18, the circuit is the same as the circuit of Fig. 11 except that capacitor 37 of Fig. 11 is replaced by inductance 46 which has a value greater than that of winding 30 when core 27 is driven by means of winding 30 from a condition of negative remanence to negative saturation and a value less than that of winding 30 when core 27 is driven by means of winding 30 from a condition of positive remanence to negative saturation. Thus, if the magnetic core 27 is in a condition of positive remanence the interrogation pulse will drive a larger amount of current through the inductance 46 than through the winding 30 and at the expiration of the interrogation pulse which will place the core in a negative remanence condition, the current will continue to flow through inductance 46 and will flow in the reverse direction through winding 30. This will return the core to its original state of positive remanence. If the core is in a state of negative remanence the interrogation pulse will drive the larger amount of current through the winding 30 and at the expiration of the pulse current will continue to flow through winding 30 and will reverse itself in inductance 46 so that the core will return to its original state of negative remanence when the energy of the system has been dissipated.

It is to be understood that the above described structures are but preferred embodiments of the invention and that various changes may be made in materials, circuit constants, and circuit arrangements without departing from the spirit or scope of said invention.

It is claimed:

1. A network for obtaining non-destructive information readout including a magnetic core having a substantially rectangular hysteresis characteristic, two input windings oppositely wound on said core so as to apply magnetizing fields of opposite polarity to said core upon the passage of a current pulse of the same polarity through said windings, an interrogation winding about said core, a reactance element associated with said interrogation winding and forming with the latter a ringing circuit, means for applying a signal pulse of such amplitude and duration through one or the other of said two input windings so as to switch said core without producing any significant ringing oscillations in said ringing circuit, and means for applyng a second signal pulse through said interrogating winding of such amplitude and duration as to switch said core and create ringing oscillations in said ringing circuit.

2. A network for obtaining non-destructive information readout comprising a bistable magnetic core having a substantially rectangular hysteresis characteristic, two input windings oppositely wound on said core so as to apply magnetizing fields of opposite polarity to said core upon the passage of a current pulse of the same polarity through said windings, an interrogation winding wound about said core, a reactance element associated with said interrogation winding and forming with the latter a ringing circuit, an output winding on said core, means for applying a resetting signal pulse for switching said core from one remanence state to its other remanence state through either one of said input windings without producing an output signal pulse in said output winding, and further means for applying a signal pulse through said interrogation winding for producing an output signal pulse in said output winding should the interrogating signal pulse switch said core.

3. A network for obtaining non-destructive information readout comprising a bistable magnetic core having a substantially rectangular hysteresis characteristic, two input windings oppositely wound on said core so as to apply magnetizing fields of opposite polarity to said core upon the passage of a current pulse of the same polarity through said windings, an interrogation winding associated with said core, a reactance element coupled to said interrogation winding and forming with the latter a ringing circuit, means for applying a signal pulse of such amplitude and duration through the interrogation winding so as to switch the core from one remanent state to its other remanent state and create oscillations in said ringing circuit to thereby supply switching energy to said core when the interrogation pulse is terminated.

4. A network for obtaining non-destructive information readout comprising a bistable magnetic core having a substantially rectangular hysteresis characteristic, input means associated with said core for applying magnetizing fields of opposite polarity to said core, an interrogation winding about said core, an output winding about said core, an energy storage device associated with said interrogation winding and forming with the latter a ringing circuit, means for applying a signal pulse of a relatively small amplitude through the input means to switch said core slowly to one or the other of its stable states without producing any significant oscillations in said ringing circuit, and means for applying a second signal pulse of a relatively high amplitude through said interrogation winding so as to produce an appreciable output pulse in said output winding whereby said interrogating pulse will switch the core quickly from one stable state to its other stable state and the energy storage device will create in said ringing circuit a return oscillatory current which upon termination of the interrogating pulse will switch the core to the stable state it was in prior to the application of the interrogating pulse.

5. A network for obtaining non-destructive information readout comprising a bistable magnetic core having a substantially rectangular hysteresis characteristic, two input windings oppositely wound on said core so as to apply magnetizing fields of opposite polarity to said core upon the passage of a current pulse of the same polarity through said windings, an interrogation winding about said core, a reactance element associated with said interrogation winding and forming with the latter a ringing circuit, means for applying a signal pulse of a relatively long duration and relatively small amplitude through one or the other of said two input windings to switch said core slowly to one or the other of its stable states without producing any significant oscillations in said ringing circuit, and means for applying a second signal pulse of a relatively short duration and relatively high amplitude through said interrogating winding so as to produce an appreciable voltage in the output winding to cause said interrogating pulse to switch the core quickly from one stable state to the other state, the reactance element creating in said ringing circuit a return oscillatory current of sufficient energy upon termination of the interrogating pulse to switch the core to the stable state it was in prior to the application of the interrogating pulse.

6. A network for obtaining non-destructive information readout comprising a bistable magnetic core having a substantially rectangular hysteresis characteristic, input means for applying magnetizing fields of opposite polarity to said core, an interrogating winding associated with said core, a reactance element and an inductive winding in series relationship, said inductive winding coupled to said core and forming with said reactance element a ringing circuit, an output winding on said care, means for applying a relatively low amplitude-long duration pulse to said input means to switch said core slowly so as to avoid the production of a voltage pulse in said output winding or oscillations in said ringing circuit, and means for applying a relatively high amplitude-short duration pulse to said interrogation winding whereby the core is switched quickly so as to produce an output voltage pulse in said output winding and to produce, by transformer action between the interrogation winding and said inductive winding, oscillations in said ringing circuit.

7. A magnetic storage unit adapted for non-destructive read-out, said unit comprising, in combination, a magnetic element capable of assuming either of two stable states of magnetic remanence; input means for said element for applying at different times magnetizing forces of opposite polarity to said element to place said element in one or the other stable state of magnetic remanence; an interrogation winding for said element; an output winding for said element; a capacitance shunting said interrogation winding and forming therewith an oscillatory circuit; means for applying to said input means a signal pulse of selected polarity and low amplitude to switch said element sufficiently slowly to a selected one or other of its two stable states that no significant output signal is induced in said output winding, said signal pulse being of sufficiently low amplitude to avoid inducing significant ringing in said oscillatory circuit; and means for applying to said interrogation winding an interrogating pulse of high amplitude to switch said element sufficiently rapidly from said one stable state to said other stable state to induce an appreciable output pulse in said output winding, said interrogation pulse being of sufficiently high amplitude to induce significant ringing in said oscillatory circuit, said interrogation pulse having such duration relative to the frequency of said ringing that at the termination of the interrogation pulse sufficient energy is stored in said capacitance to switch said element back to its said one state.

References Cited in the file of this patent

UNITED STATES PATENTS

| | | |
|---|---|---|
| 2,276,680 | Allen | Mar. 17, 1942 |
| 2,614,167 | Kamm | Oct. 14, 1952 |

OTHER REFERENCES

Pub.: "Magnetic Triggers," Proc. of I. R. E., June 1950, pp. 626–629.